(12) United States Patent
Cook

(10) Patent No.: US 6,904,136 B1
(45) Date of Patent: Jun. 7, 2005

(54) SECURE METHOD OF PAYMENT

(75) Inventor: Fred S. Cook, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 10/298,770

(22) Filed: Nov. 18, 2002

(51) Int. Cl.⁷ .............................................. H04M 15/00
(52) U.S. Cl. .......................... 379/114.25; 379/114.14; 379/127.02; 705/53; 705/75; 705/39; 705/44
(58) Field of Search .................. 455/405–409; 705/1, 35, 37–40, 44, 52–53, 59, 75, 76; 379/114.15–114.2, 144.2, 114.14, 127.02, 114.25

(56) References Cited

U.S. PATENT DOCUMENTS

| | | |
|---|---|---|
| 5,003,584 A | 3/1991 | Benyacar et al. |
| 5,148,474 A | 9/1992 | Haralambopoulos et al. |
| 5,187,710 A | 2/1993 | Chau et al. |
| 5,333,186 A | 7/1994 | Gupta |
| 5,524,142 A | 6/1996 | Lewis et al. |
| 5,619,554 A * | 4/1997 | Hogan et al. ............... 379/88.1 |
| 5,625,668 A | 4/1997 | Loomis et al. |
| 5,652,786 A | 7/1997 | Rogers |
| 5,845,267 A | 12/1998 | Ronen |
| 6,014,435 A | 1/2000 | Rosen |
| 6,023,502 A | 2/2000 | Bouanaka et al. |
| 6,041,319 A | 3/2000 | Bass et al. |
| 6,088,683 A | 7/2000 | Jalili |
| 6,125,349 A * | 9/2000 | Maher ............................ 705/1 |
| 6,134,306 A | 10/2000 | Lautenschlager et al. |
| 6,240,402 B1 | 5/2001 | Lynch-Aird |
| 6,282,276 B1 | 8/2001 | Felger |
| 6,298,126 B1 | 10/2001 | Kawecki et al. |
| 6,711,156 B1 * | 3/2004 | Gourraud ..................... 370/352 |
| 2002/0116270 A1 * | 8/2002 | Potiker ......................... 705/14 |
| 2003/0046237 A1 * | 3/2003 | Uberti .......................... 705/44 |

* cited by examiner

Primary Examiner—Duc Nguyen

(57) ABSTRACT

A process for a transfer of funds for payment for goods and/or services in which a purchaser of the goods and/or services requests that a financial services organization generate a financial certificate in an amount equal to the payment. The requester receives the requested certificate and then transmits the certificate to the provider of good and/or services. Upon validation of the certificate by the provider, the transaction is completed and the purchaser so notified. The purchaser is subsequently billed by the financial services organization for the cost of the certificate.

20 Claims, 6 Drawing Sheets

SECURE METHOD OF PAYMENT

BACKGROUND OF INVENTION

This invention relates in general to electronic transfer of funds and in particular to the use of automated telephone billing systems to provide a secure payment for goods and services.

In recent years there has been a proliferation of catalogs being distributed via mail to facilitate the convenience of home shopping. The catalogs usually include both a toll free number and an internet address for an internet store. The customer can simply telephone or contact the company via the internet from his home and order advertised goods and/or services. Usually the telephone lines are manned 24 hours a day, seven days a week while the internet provides similar access. Such continuous availability has proven very popular, allowing shopping from home at any time with the products delivered directly to the purchaser's residence. Additionally, search engines can provide access to internet stores for providers of goods and services without the need of catalogs.

In order to complete telephonic and internet purchases, it is necessary to provide payment for the products being purchased. With the increased tempo provided by use of the telephone or internet to purchase products, it would be cumbersome and time consuming to be required to mail a personal check as payment to the provider of the product. The use of a personal check for payment would not only delay shipment of the product while awaiting receipt and subsequent clearance of the check, but would also require more handling of paper, increasing the costs of the provider. Accordingly, payment is typically made by the purchaser charging the cost of the purchase to a credit card.

Thus, inherent with use of the telephone or internet to purchase goods and services is the provision of personal financial information over the internet to the provider of goods and services. Typically, the information includes a credit card account number for the purchaser. The credit card account number may or may not encrypted during transmission. When the account number is not encrypted, there is a potential for the account number to be obtained by an unauthorized person who could then use the account for their purposes. Additionally, even when the account number is encrypted, there are other valid concerns when personal financial information is provided to another party. First, the purchaser does not know that the receiver of the information, that is the provider, is actually trustworthy. Thus, there is a concern that the provider may misuse the financial information. Second, if the information is misused, there is a concern that there is not a limit upon the magnitude of the purchaser's losses. Such losses include not only the actual financial loss, but also cost the purchaser in terms of time, reputation and repeated occurrences. Finally, there is a concern as to whether the provider will adequately protect the received financial information. Unfortunately, it has been determined that some of the largest credit card fraud rings operate by collecting poorly protected customer and accounts receivable databases from the internet. Accordingly, it would be desirable to provide a method for procuring goods and services over the internet that separates the purchaser's financial information and records from provider access.

SUMMARY OF INVENTION

This invention relates to a process that utilizes an automated telephone billing system to provide for secure purchase of goods and services over the internet.

The present invention contemplates utilization of a third party during a purchase of goods and/or services over the internet, the telephone or similar devices. The third party would function as a financial broker to provide a secure monetary transfer between the purchaser and the provider and would be preferably trusted by both. The method contemplates that utilization of such a broker would limit the risk to the purchaser to the dollar value of his purchase while the provider, or seller, would mitigate his risks by delegating the identification, authorization and settlement to the broker. Accordingly, the invention is directed toward a process for providing payment for goods and/or services in which a purchaser of the goods and/or services contacts a financial services organization. In the preferred embodiment, the financial services organization uses an enhanced intelligent voice response unit that functions similar to a value added telephone service. The intelligent voice response unit holds a telephone line open at a predetermined rate to generate a financial certificate for a requested amount of money for use as a payment to a specified provider. Alternately, Dual Tone Muti-Frequency signals generated by a telephone keypad can be utilized to indicate the desired value of the certificate. The financial certificate is transmitted to the purchaser, who then forwards the certificate to the provider as payment for ordered goods and/or services. The automated telephone billing system subsequently sends a statement or invoice for the cost of the certificate to the purchaser.

The invention also contemplates that the provider would subsequently contact the automated telephone billing system to validate the proffered certificate. Only upon validation of the certificate would the transaction be completed and the purchaser so notified.

Various objects and advantages of this invention will become apparent to those skilled in the art from the following detailed description of the preferred embodiment, when read in light of the accompanying drawings.

DETAILED DESCRIPTION

Figure 1:
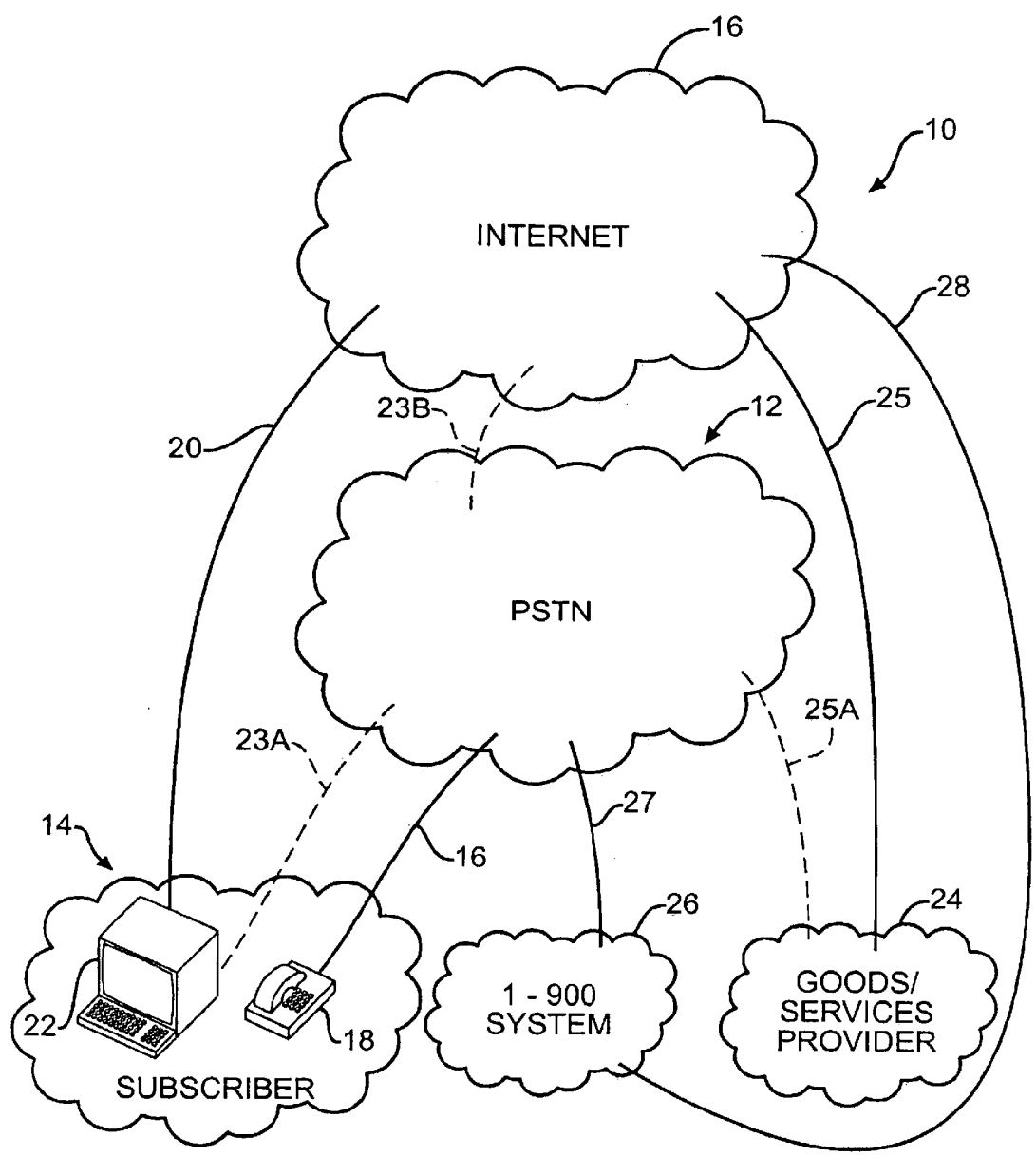
FIG. 1 is a schematic drawing of a telephone system that utilizes the present invention.

Referring now to the drawings, there is illustrated in FIG. 1, a schematic diagram of a typical telephone system 10 that includes the present invention. Central to the telephone system 10 is a Public Switched Telephone Network (PSTN) 12 that includes a plurality of Local Exchange Carriers (LEC) that are not shown in FIG. 1. The PSTN 12 also includes conventional long distance communication systems (not shown), such as toll carriers or interexchange carriers (IXC's) that interconnect the individual LEC's. The LEC's are connected to individual telephone service subscribers, or users, 14, one of which is shown, and provide access to other subscribers that are connected to the PSTN 12. Typically, the LEC's process calls to and from their local telephone subscribers while the IXC's process calls between the LEC's for callers who are dialing long distance. Also shown in FIG. 1 is the internet 16 which provides connections to internet service subscribers.

As shown in FIG. 1, the telephone subscriber 14 has a first service line 16 connecting his telephone 18 to the PSTN 12 and a second service line 20 connecting a MODEM in his Personal Computer (PC) 22 to the internet 16. Typically, the PC 22 is connected to the internet 16 by either a conventional phone line or a high speed cable. An alternate connection from the PC 22 to the internet 16 via the PSTN 12 is shown by dashed lines labeled 23A and 23B. Such connections are conventional and allow access to the internet via the PC 22 while also allowing simultaneous use of the telephone 18. A plurality of goods and/or service providers 24, one of which is shown in FIG. 1, are also connected to the internet 24 via an internet connection 25. Usually, the goods/services provider 24 is also connected by a telephone line 25A to the PSTN 12 to enable receipt of telephonic orders. Typical goods/services providers include retailers that provide catalog sales via toll free 1-800 telephone numbers while typical service providers include airlines that provide travel arrangements via central reservation systems that are also accessible via toll free numbers.

Because the interact 16 and the PSTN 12 include long distance capabilities, the goods/services provider 24 can be remotely located from the individual user 14. As described above, the convenience of purchasing goods and/or services over the internet has become widely accepted. Typically, the individual user 14 can utilize his PC 22 to contact the provider 24 through the internet 16 or, alternately, he can utilize his telephone 18 to contact the provider 24 through the PSTN 12 at any time on any day and order goods and/or services. Various systems for purchases over the internet 16 are well know and usually involve the user 14 filling a "shopping cart" with the desired products via the internet 16. Once all items have been ordered, the user 14 "checks out" by providing a credit card account number to the provider 24 for charging the costs of the ordered items. Alternately, the user 14 can place a telephonic order with a sales representative via the PSTN 12.

Also shown connected to the PSTN 12 in FIG. 1 is a 1-900 system 26. Such systems were developed several years ago by entities referred to as Information Providers (IP's). The IP industry was born in 1980 when the American Telephone & Telegraph Co. and the American Broadcasting Corporation established a telephone line to receive "votes" on the winner of a presidential debate between Jimmy Carter and Ronald Reagan. Enterprising entrepreneurs soon began to exploit the business potential of these new telephone lines.

An IP is a business entity that provides services that supplant the plain local and long distance telephone services provided by the LEC's and the IXC's. The services provided by an IP are paid for by the caller or telephone subscriber, usually on a pay-per-call basis. Typically, the telephone subscriber dials an IP number having a 900 or 976 area code, and the charges appear on the subscriber's telephone bill by way of a system known as a Billing & Collection (B&C) System. The services provided by an IP are typically in the nature of "audio-text" information supplied in response to voice-mail style accessing. In addition to conducting public-opinion polls, IP's also provide information on a wide variety of subjects, such as, for example, sports information, entertainment information, and the like.

The present information contemplates providing an IP type service that that utilizes a third party financial broker who would generate financial certificates for payment for goods and/or services ordered over the internet. In the following, the IP service provider will be referred to as the 1-900 system 26. While the 1-900 system 26 would probably be a financial institution, such as a bank where the telephone subscriber 14 has a savings and/or checking account, other organizations also could be a 1-900 system 26, such as a credit union, a credit card company, or even the subscriber's LEC. It is also contemplated that the 1-900 system 26 could be the local telephone company or the subscriber's long distance service provider.

Figure 2:
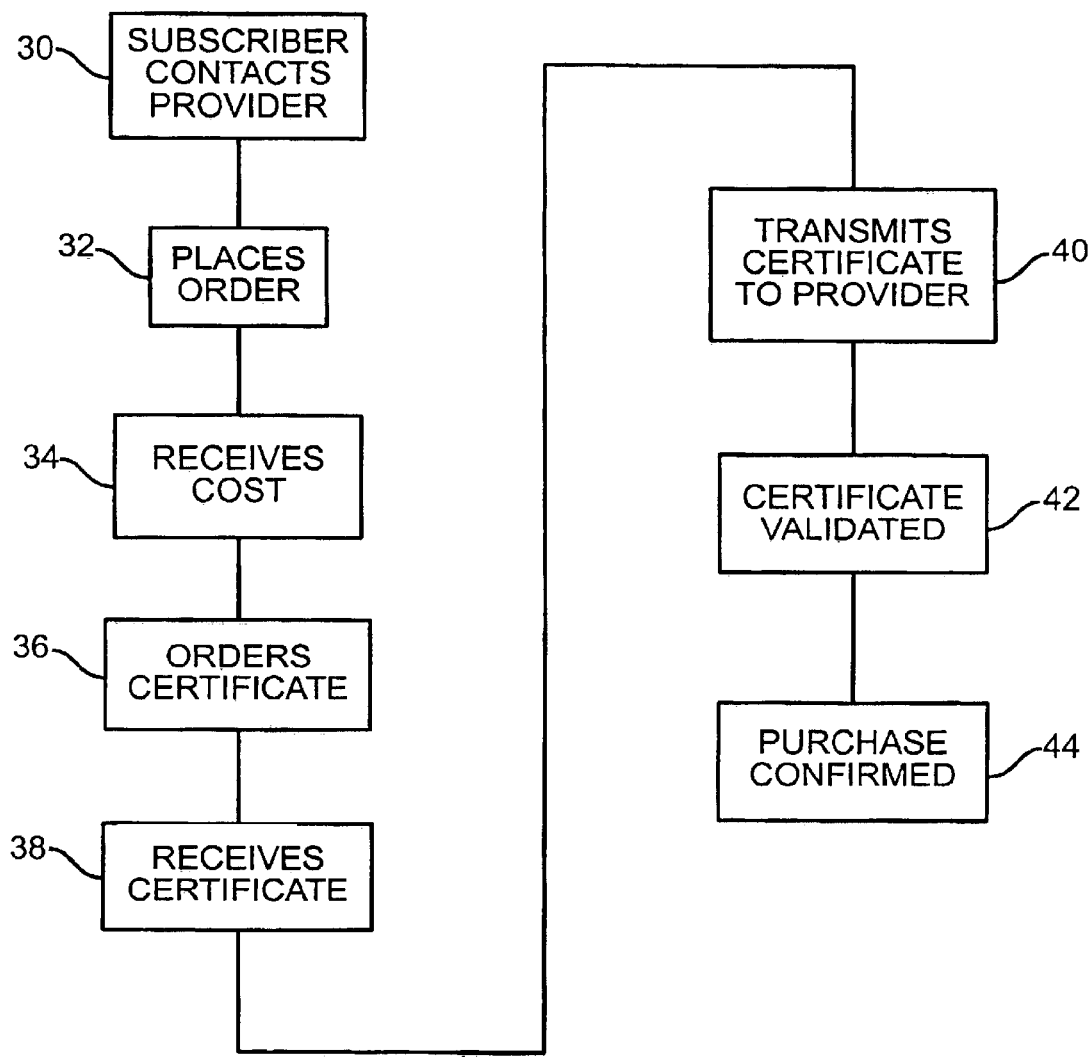
FIG. 2 is a flow chart illustrating a purchase of goods and/or services via the telephone system shown in FIG. 1 that includes a third party financial broker in accordance with the present invention.

An overview of the invention is provided by the flow chart shown in FIG. 2. In the preferred embodiment, the telephone subscriber uses his PC 22 to contact the provider of goods and/or services 24 through the internet 16 and his telephone 18 to contact the 1-900 system through the PSTN 12. In functional block 30, the telephone subscriber 14 directly enters the internet 16 via his PC 22 and line 20 to contact the goods/services provider 24. Alternately, the subscriber 14 could reach the internet 16 through the PSTN 12 via lines 23A and 23B. The modem in the PC 22 is connected through the internet 16 to the goods/services provider 24. The subscriber 14 typically selects items for purchase from an on-line catalog that is maintained by the provider 24, as shown in functional block 32. Upon the subscriber 14 pressing the appropriate key, the provider 24 transmits the total cost of the order, to include any handling and shipping charges, in functional block 34 for display upon the PC 22.

In functional block 36, while maintaining his connection with the provider 24 via the internet 16, the subscriber 14 uses his telephone 18 to dial the 1-900 system 26. The subscribers telephone 18 is connected through the PSTN 12 to the 1-900 system 26 via line 27. As also shown in FIG. 1, the invention also contemplates that the 1-900 system may be connected by line 28 to the internet 16 to allow internet access; however, in the following description, it is assumed the subscriber used his telephone 18 to contact the 1-900 system 26. As will be described below, the subscriber 14 requests a financial certificate equal to the amount of the charges for the goods/services and the 1-900 system 26 will generate the certificate. In functional block 38, the certificate generated by the 1-900 system 26 is transmitted through the PSTN 12 to the telephone subscriber 14 via his telephone 18. The telephone subscriber 14 then utilizes his PC 22 to transmit the certificate back through the internet 16 to the goods/services provider 40, as shown in functional block 40.

In functional block 42, the goods/services provider 24 contacts the 1-900 system 26 via the PSTN 12 to validate the financial certificate. Alternately, the provider 24 can contact the 1-900 system 26 through the internet 16. Upon sucessfully validating the certificate, the goods/services provider 40 closes the transaction and notifies the telephone subscriber 14 through the internet 16 of the fact, as shown in functional block 24.

Subsequently, the 1-900 system 26 collects the amount of the certificate from the telephone subscriber 14 (not shown). It is contemplated that the collection can be completed in one of several ways. If the 1-900 system 26 is affiliated with a financial institution of which the subscriber 14 is a member, the subscriber's account could be debited by the amount of the charge. Alternately, the 1-900 system 26 could periodically, such as on a monthly basis, generate an invoice or statement that is forwarded to the subscriber 14 for payment. If the 1-900 system 26 is affiliated with the subscriber's LEC or an IXC, the charges could be included in the subscriber's telephone bill.

The inventor believes that his invention provides a number of advantages over the common use of credit card accounts to complete purchase transactions. First of all, the invention produces a network transaction credit for a specified amount. If, by some means, the certificate is fraudulently intercepted, any losses would be limited to the specified amount of the certificate. Similarly, because the telephone subscriber's financial account and/or credit information is not transmitted over the internet, the information is protected. The 1-900 system 26 provides a single point clearing house for low dollar amount transactions. Finally, most potential for the abuse of credit is removed since each specific financial certificate generated by the 1-900 system is a one time occurrence and can not be re-used.

Figure 3:
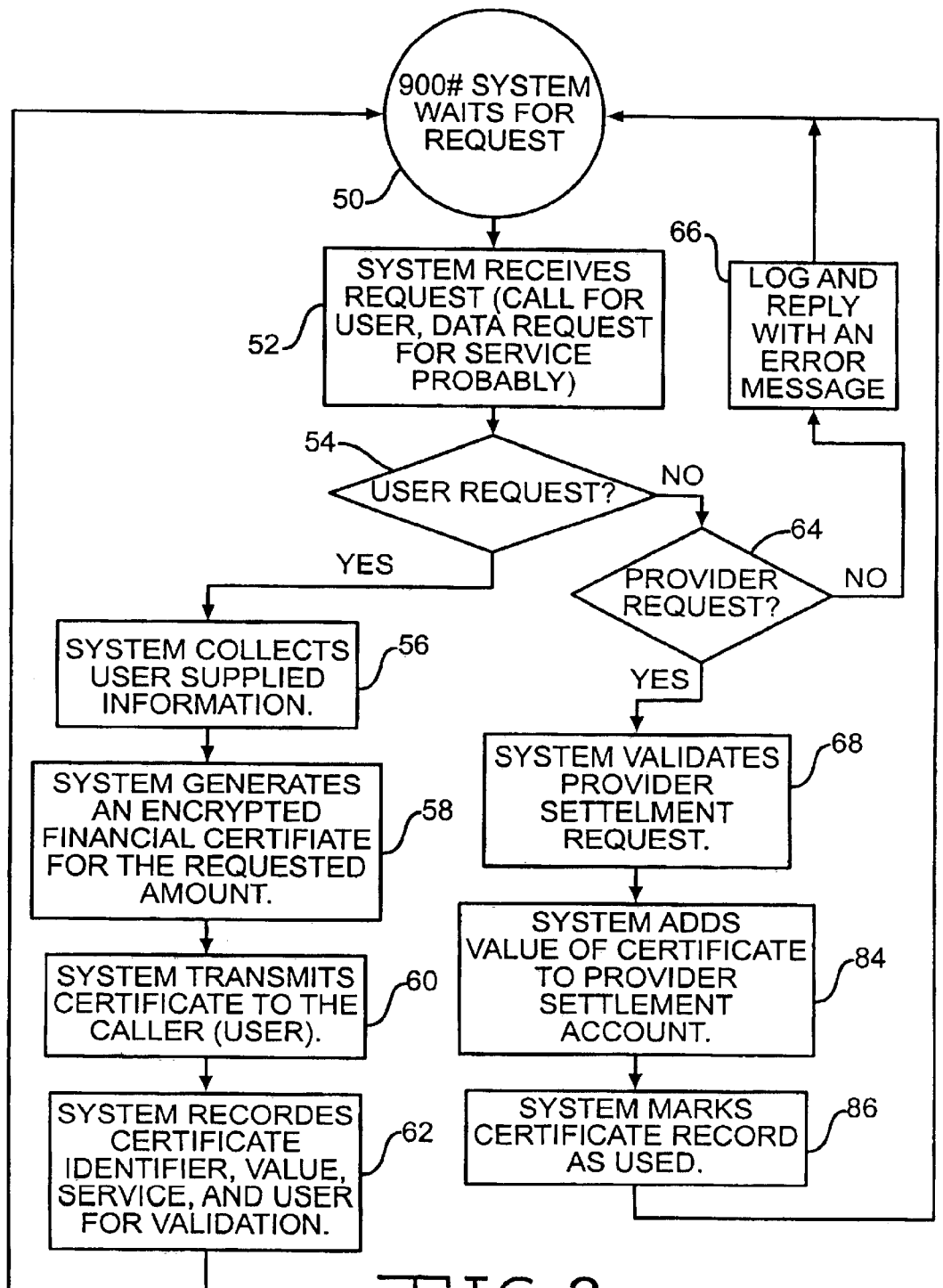
FIG. 3 is a flow chart for an algorithm for a third party financial broker billing system that is included in FIG. 2.
Figure 5:
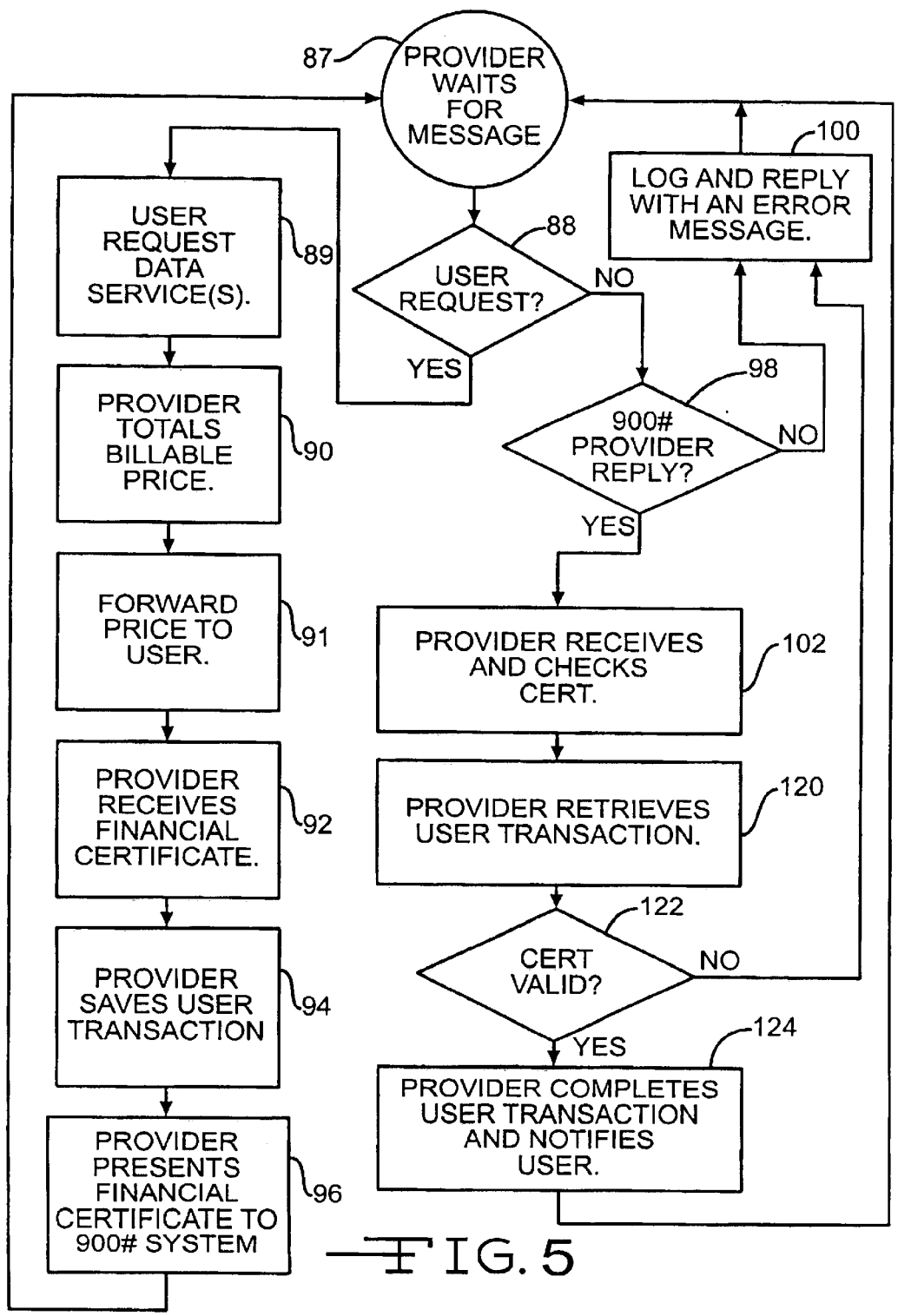
FIG. 5 is a flow chart for an algorithm for a provider of goods and/or services that is included in FIG. 2.

A detailed algorithm for operations at the 1-900 system 26 in response to a request for a financial certificate is illustrated by the flow chart shown in FIG. 3 while an algorithm for the concurrent operations at the goods/services provider 24 is illustrated in the flow chart shown in FIG. 5. Referring first to FIG. 3, entry block 50 shows the 1-900 system 26 waiting for a service request. Receipt of service request is shown in functional block 52. As described above, during normal operations, the 1-900 system 26 expects to receive requests from the PSTN 12, the internet 16 or data networks. Such calls originate from one of two sources, namely, either from the individual telephone subscriber 14 for preparation of a certificate, or from the goods/services provider 24 for validation of a certificate. Accordingly, two paths are illustrated in FIG. 3. The path on the left side of the figure is followed for a subscriber certificate request while the path on the right side of the figure is followed for a validation request.

The division between the two paths begins in decision block 54 where the source of the request is examined. In the preferred embodiment, the algorithm utilizes the Automatic Number Identification (ANI) of the caller to determine the source of calls received from the PSTN 12 and a fixed network or address retailer id to determine the source of messages received from the internet 16 or a data network. Alternately, the 1-900 system 26 could be available to pre-registered users and could compare the caller's number to a stored list of such users. Upon determining that the call is from a telephone subscriber 14, the algorithm enters the left branch and proceeds to functional block 56 where information is collected from the subscriber 14. In the preferred embodiment, an enhanced Intelligent Voice Response (IVR) unit is utilized to prompt verbally provided information from the subscriber 14. Alternately, information can be provided with a touch tone keypad that generates Dual Tone Multi-Frequency (DTMF) signals on the telephone 18, or if a computerized dialer is available, in a digital format. Information would include, at a minimum, the amount requested for the financial certificate and an identification name or code for the goods/services provider 24. Additional information could include a requester identification tag that would allow multiple users for each ANI, a request date and time, a sequence number, a merchant network address and the like. The sequence number would provide an ability to detect duplicate requests and fraud attempts. The sequence number also would enable reversal of the charges. Similarly, the merchant network address could be used to detect fraud attempts.

In functional block 58, the 1-900 system 26 generates a financial certificate in the amount requested. As indicated above, in the preferred embodiment, an enhanced IVR is prompted via a script to hold the line open for a length of time corresponding to the desired certificate amount. The call time duration is then translated into a billable value based upon a rate translation mechanism in the billing system. Alternately, DTMF tones may be used by the IVR instead of, or in addition to, the call duration. When DTMF tones are used, they are converted into rating flags that are understood by the 1-900 system 26 and are translated into a billable value. Additionally, a service or connection charge is included in the total charged.

It is contemplated that a range of 1-900 numbers could be utilized by the system 26 to generate certificates. Each of the 1-900 numbers would be associated with a different charge rate range. The subscriber 14 would select the appropriate number for dialing that corresponds to the desired certificate value. For example, dialing 1-900-xxx-yyy1 could provide the subscriber 14 with a $1.95 connection charge and a $10.00 per minute charge for the actual certificate while dialing 1-900-xxx-yyy2 could provide the subscriber 14 with a $2.49 connection charge and a $25.00 per minute charge for the actual certificate. The system 26 would include the capability to use a fractional minute for amounts that are less than the per minute rate. Thus, the financial certificate could be generated for the exact amount that was requested. Finally, the financial certificate is encrypted for transmittal to the subscriber 14. The algorithm then advances to functional block 60.

In functional block 60, the financial certificate is transmitted through the PSTN 12 to the subscriber 14. The transmittal can be verbal, tone based, digital or any other conventional mode of transfer. As described above, the subscriber 14 then transmits the certificate back through the internet 16 to the goods/services provider 24. For the example shown in FIG. 1, the subscriber 14 would receive a verbal coded identification number over his telephone 18 and enter the identification number via a keyboard into his PC 22. The PC modem would then transmit the certificate identification number through the internet 16 to the goods and services provider 24.

After the certificate is transmitted to the subscriber 14 in functional block 60, the algorithm advances to functional block 62 where the system 26 records the certificate identifier, value, provider and subscriber identification for later validation. The system 26 then returns to entry block 50 and awaits the next request.

Returning now to decision block 54, if the system determines that the request is not from a subscriber, the algorithm transfers to decision block 64 and checks for a goods/services provider identifier, which can be an ANI or some other code, such as a retailer id or, if supplied via the internet 16, a fixed network address. If a provider is not identified, the algorithm transfers to functional block 66 where an error code is logged and an error message is generated for transmission back to the requester. The algorithm then returns to entry block 50 and awaits the next request.

Upon a positive identification of a goods/services provider 24 in decision block 64, the algorithm transfers to functional block 68 for validation of the financial certificate. For validation, the goods/services provider 24 would transmit information concerning the certificate with the validation request to include an identifier for both the provider 24 and the certificate. Accordingly, the system 26 proceeds to verify the certificate by comparing the information supplied by the provider 24 with the data recorded for the certificate in functional block 62. A subroutine for verification is illustrated by the flow chart shown in FIG. 4.

Figure 4:
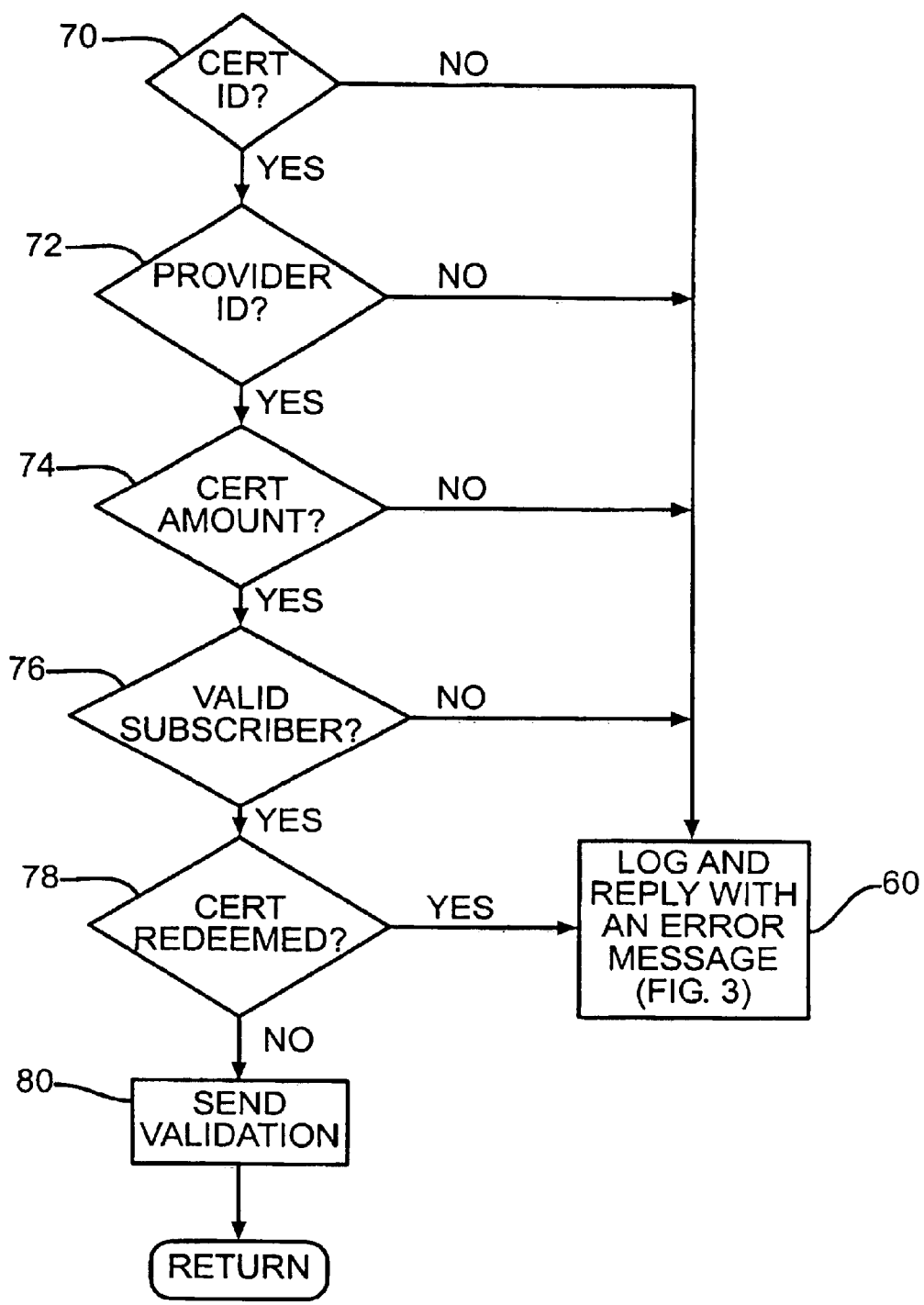
FIG. 4 is a flow chart that illustrates a certificate validation subroutine that is included in FIG. 3.

In FIG. 4, a series of queries are performed. The sequence shown in FIG. 4 is intended to be exemplary and it will be appreciated that the specific sequencing of the steps can be vary. As illustrated, the series begins with decision block 70 where the certificate identifier is checked with issued certificate identifiers to confirm that the certificate was generated by the 1-900 system 26. If the certificate identifier is not found, the subroutine exits to functional block 66 in the main algorithm where an error code is logged and an error message is generated for transmission back to the provider 24. If the subroutine determines that the certificate identifier is valid, the subroutine advances to decision block 72.

In decision block 72 the identifier for the goods/services provider 24 is compared for the stored value associated with the particular certificate. If the identifier for the provider 24 is not found, the subroutine exits to functional block 66 in the main algorithm where an error code is logged and an error message is generated for transmission back to the provider 24. If the subroutine determines that the identifier for the provider 24 is valid, the subroutine advances to decision block 74.

In decision block 74 the amount of the financial certificate supplied by the provider 24 is compared for the stored value associated with the particular certificate. If the amount differs from the stored value, the subroutine exits to functional block 66 in the main algorithm where an error code is logged and an error message is generated for transmission back to the provider 24. If the subroutine determines that the certificate amount is correct, the subroutine advances to decision block 76.

In decision block 76 the identity of the subscriber 14 is compared to the stored subscriber associated with the particular certificate. In the preferred embodiment, the ANI's are compared, however, other methods could be utilized. If the subscriber identity differs from the stored identity, the subroutine exits to functional block 66 in the main algorithm where an error code is logged and an error message is generated for transmission back to the provider 24. If the subroutine determines that the identity matches the stored identity, the subroutine advances to decision block 78.

In decision block 78 the subroutine checks to determine whether the particular certificate has been redeemed previously. If the certificate has been previously redeemed, the subroutine exits to functional block 66 in the main algorithm where an error code is logged and an error message is generated for transmission back to the provider 24.

If the subroutine determines that the certificate has not been previously redeemed, the subroutine advances to functional block 80 where an approval code is generated and time stamped. The 1-900 system 26 then encrypts an identifier code for the goods/services provider 24, the approval and a timestamp using a public encryption code stored for the provider 24. A validation message that includes the above listed encrypted data is generated and transmitted through the PSTN 12 to the provider 24. The subroutine then returns to the main algorithm at functional block 84 that is included in FIG. 3.

In functional block 84, the algorithm adds the value of the certificate to the settlement account of the subscriber 14. Alternately, if the 1-900 system 26 is included in the subscriber's financial institution, the system 26 may debit an account of the subscriber. The algorithm then proceeds to functional block 86 and marks the particular certificate as being redeemed. Finally, the algorithm returns to entry block 50 to await the next request.

Referring now to FIG. 5, the series of events that are occurring at the provider 24 during the purchase illustrated in FIG. 2 will now be described. The flow chart is intended to be exemplary and it will be appreciated that specific details of operation can vary from those shown. Similar to the flow chart shown in FIG. 3 for operation of the 1-900 system 26, the provider 24 expects to receive contacts from the PSTN 12, the internet 16 or data networks. Such contacts can originate from one of two sources; namely, either a request for goods and/or services from the individual telephone subscriber 14, or a reply from the 1-900 system 26 in response to a request for validation of a subscriber's certificate. Accordingly, two paths are illustrated in FIG. 3. The path on the left side of the figure is followed for a subscriber request while the path on the right side of the figure is followed for a validation request response.

The algorithm begins with entry block 87 where the provider 24 awaits a message from either the subscriber 14 or the 1-900 system 26. Upon receipt of a message, the algorithm advances to decision block 88 where the source of the request is examined. In the preferred embodiment, the algorithm utilizes the Automatic Number Identification (ANI) to determine the source of calls received from the PSTN 12 and a fixed network address or retailer id received from the internet 16 or a data network. Upon determining that the call is from a telephone subscriber 14, the algorithm enters the left branch and proceeds to functional block 89 where order information is collected from the subscriber 14. This block corresponds to the functional block labeled 32 in FIG. 2. As described above, the provider 24 develops a customer order from the information provided by the subscriber 14 in response to a series of prompts. Upon receipt of an order completion signal, such as clicking upon a "check out now" button on the PC screen, the algorithm proceeds to function block 90 where the costs of the individual items are totaled and applicable taxes, shipping and handling charges added to determine the total cost of the order. The total cost is then transmitted to the subscriber 14 via the internet 16, as shown in functional block 91.

As shown in functional blocks 34 through 40 in FIG. 2, the customer receives the total cost, orders a financial certificate for the cost of the order from the 1-900 system 26 and forwards the certificate through the internet 16 to the provider 24. As described above, the ordering and preparation of the certificate is covered in the left portion of the flow chart shown in FIG. 3. The certificate is received by the provider 24 in functional block 92 of FIG. 5. Following receipt of the financial certificate, the algorithm advances to functional block 94 where the order information is saved for future reference. The algorithm then presents or forwards the certificate through the PSTN 12 or the internet 16 to the 1-900 system 26 for validation and subsequently returns to entry block 87 to await another message.

As described above, the request for validation triggers the steps shown in the right branch of the flow chart in FIG. 3 for the 1-900 system 26. When the 1-900 system 26 completes the tests in functional block 68 of FIG. 3, the system 26 will send a certificate validation message through the PSTN 12 or the internet 16 to the provider 24. The validation message arrives in entry block 87 of the provider flow chart shown in FIG. 5. The algorithm proceeds to decision block 88 where the message is tested for being a subscriber request. Since the message is from the 1-900 system 26, the results of the test are negative and the algorithm enters the right branch of the flow chart by transferring to decision block 98.

In decision block 98, the provider checks for a 1-900 system identifier, which is probably a digital identifier coupled with a mechanism for non-repudiation or some other prearranged code. If a 1-900 system 26 is not identified, the algorithm transfers to functional block 100 where an error code is logged and an error message is generated for transmission back to the subscriber 14 and the 1-900 system 26. The algorithm then returns to entry block 87 and awaits the next request.

If a valid 1-900 system 26 is identified in decision block 98, the algorithm proceeds to functional block 102 where the certificate is received and tested for acceptance. A subroutine for the certificate tests, which is similar to the subroutine for data validation shown in FIG. 4, is illustrated in FIG. 6.

Figure 6:
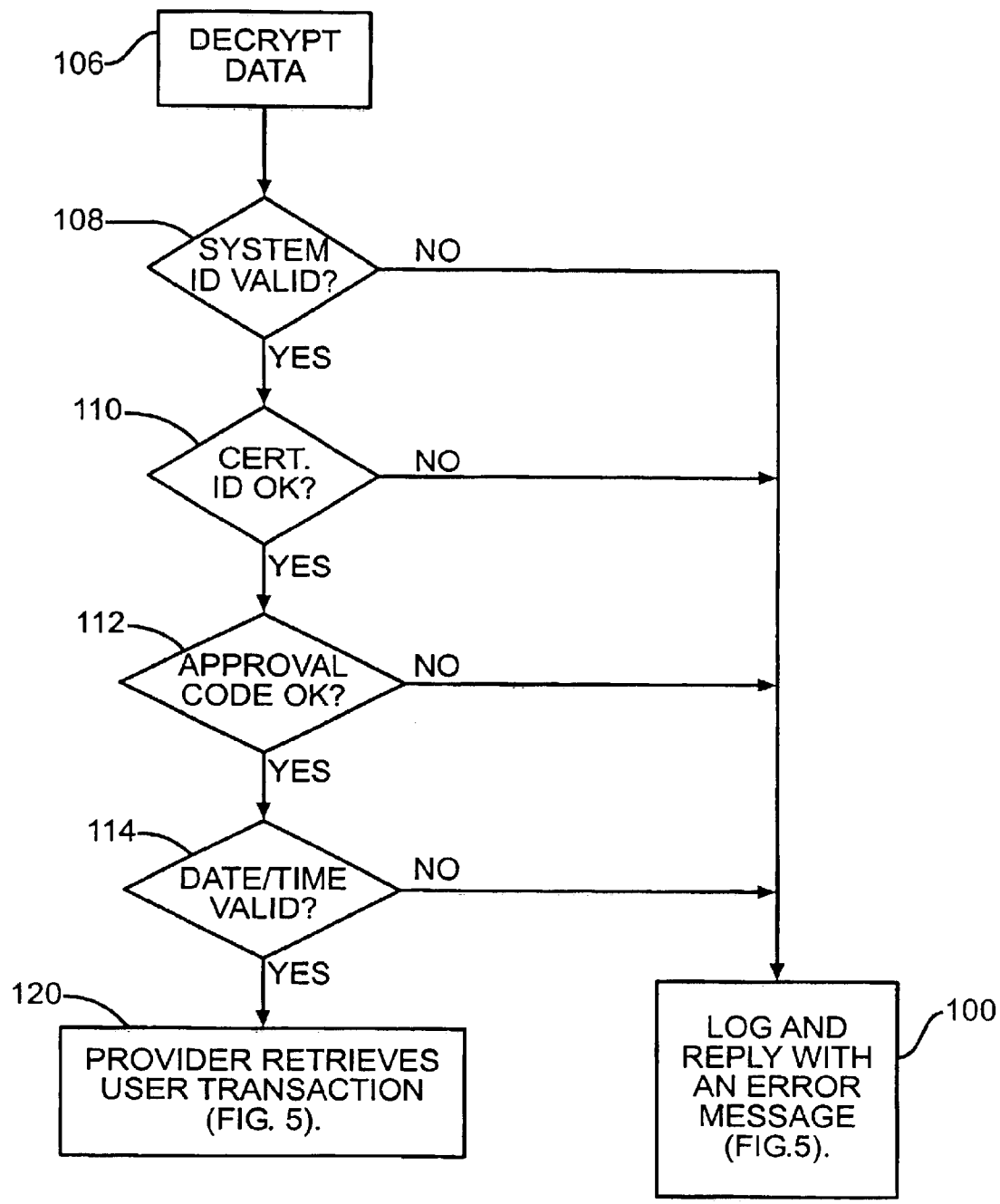
FIG. 6 is a flow chart that illustrates a certificate validation subroutine that is included in FIG. 5.

In FIG. 6, a series of queries are performed. The sequence shown in FIG. 6 is intended to be exemplary and it will be appreciated that the specific steps shown and the sequencing of the steps can vary. As illustrated, the series begins with functional block 106 where the encrypted data included with the certificate is decrypted. The subroutine then advances to decision block 108 where the system identifier is checked with issued known system identifiers to confirm that the certificate was generated by a valid 1-900 system 26. If a valid system identifier is not found, the subroutine exits to functional block 100 in the main algorithm where an error code is logged and error messages are generated for transmission back to the 1-900 system 26 and the subscriber 14. If the subroutine determines that the system identifier is valid, the subroutine advances to decision block 110.

In decision block 110, the certificate identifier is compared to previous certificate identifiers issued the identified 1-900 system to confirm that the certificate came from the same 1-900 system. If the certificate identifier does not correspond to the identified 1-900 system, the subroutine exits to functional block 100 in the main algorithm where an error code is logged and error messages are generated for transmission back to the 1-900 system 26 and the subscriber 14. If the subroutine determines that the certificate identifier corresponds to the identified 1-900 system, the subroutine advances to decision block 112.

In decision block 112, the decrypted approval code is checked. If the approval code is absent, or incorrect, the subroutine exits to functional block 100 in the main algorithm where an error code is logged and error messages are generated for transmission back to the 1-900 system 26 and the subscriber 14. If the subroutine determines that approval code is valid, the subroutine advances to decision block 114.

In decision block 114, the decrypted date/time stamp is checked for validity. If the date/time stamp is absent, or incorrect, the subroutine exits to functional block 100 in the main algorithm where an error code is logged and error messages are generated for transmission back to the 1-900 system 26 and the subscriber 14. If the subroutine determines that the date/time stamp is valid, the subroutine advances by returning to functional block 120 in the main algorithm.

In functional block 120, the provider 24 retrieves the transaction data stored previously in functional block 94. The algorithm then compares the identification of the subscriber 14 and the amount of the certificate with the stored data. The algorithm proceeds to decision block 122 where the stored transaction data is compared to the corresponding certificate data. If the certificate data does not match the stored transaction data, the algorithm transfers to functional block 100 where an error code is logged and error messages are generated for transmission back to the 1-900 system 26 and the subscriber 14. If the algorithm determines that the certificate data does match the stored transaction data, the subroutine advances to functional block 124 where the transaction is completed and the subscriber 14 so notified. The algorithm then returns to the entry block 87.

It is contemplated that the operations described above are quickly carried out and hence occur concurrently. Thus, as described above, the subscriber 14 remains connected to the provider 24 while contacting the 1-900 system 26 to obtain a certificate. Similarly, the subscriber 14 would remain on line with his internet connection to the provider 24 while the provider 24 validates the certificate with the system 26. Alternately, the subscriber 14 could sign off from the internet 16 once he transmits the certificate to the provider 24. For such a case, the provider 24 could subsequently e-mail the subscriber 14 a confirmation that his certificate was validated and the transaction completed.

While the preferred embodiment has been illustrated and described with the subscriber 14 contacting the goods/services provider 24 via a PC 22 connected to the internet 16 and the 1-900 system 26 with a telephone 18, it will be appreciated that the invention also can be implemented entirely using the PC 22. However, in order to do so, it is necessary that the PC 22 be connected to the internet via one link, such as, for example, DSL or cable and also to the PSTN 12 via a standard dial up modem. Preferably, the PC 22 would have a computerized modem, which would permit the PC 22 to be programmed to automatically contact the 1-900 system 26. The two means for establishing a connection are required since 1-900 system 26 is an existing system that positively identifies the subscriber 14 by his ANI. If the subscriber were to access the 1-900 system 26 via the internet 16, the 1-900 system would lack the subscriber's ANI and thereby not be able to determine the identity of the subscriber. If the PC 22 receives the purchase information from the provider 24 and then dials the 1-900 system 26 through the PSTN 12 on the lines 23A and 25A, the customer, or subscriber, identification can be determined by the 1-900 system 26. Accordingly, contact with the 1-900 system 26 can be established directly from the PC keyboard via the PSTN 12 and the financial certificate forwarded from the 1-900 system directly to the subscriber's PC 22, via DTMF tones or a modulated data link. When requesting the certificate from the 1-900 system, the subscriber would reply with appropriate keyboard entries to a series of prompts appearing upon his PC monitor in lieu of replying verbally. The certificate would then be forwarded to the goods/services provider 24 via the internet 16 as described above.

Additionally, while the preferred embodiment of the invention has been illustrated and described for a user completing a transaction over the internet, it will also be appreciated that the invention also can be utilized for payment for telephonic purchases via toll free numbers that are typically included in catalogs. Thus, it is contemplated that the subscriber 14 could contact the provider 24 by telephone, as when a toll free number is provided in lieu of an internet address. The subscriber could then utilize his PC 22 to contact the 1-900 system 26 to obtain a financial certificate for payment (not shown).

In a similar manner, the invention further contemplates that a transaction can be completed entirely by telephone, without use of a PC (not shown). Such an application would allow a user who does not have a credit card to conveniently make purchases from his home or workplace. The invention contemplates several methods for completing the transaction entirely by telephone. For example, the subscriber could place the provider on hold while calling the 1-900 system. Upon receiving the needed certificate information from the 1-900 system, the subscriber would remove the provider from hold status and complete his transaction. Alternately, the subscriber could place the call to the 1-900 system on a second telephone line, if one is available. Finally, the subscriber could terminate his call to the provider after obtaining a transaction identifier. The subscriber would then call the 1-900 system to obtain the certificate. After obtaining the certificate information, the subscriber would call the provider again, identify the transaction with the transaction identifier and then supply the certificate information to the subscriber to complete the transaction.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A secure process for providing payment comprising the steps of:
   (a) contacting a financial services organization that utilizes an intelligent voice response unit, the intelligent voice response unit being operative to prompt information from the caller needed to generate a financial certificate, the intelligent voice response unit also having a predetermined rate with the value of the financial certificate generated being determined by holding a telephone line open for a period of time equivalent to a desired value;
   (b) requesting that the financial services organization generate the financial certificate for payment to a specified provider;
   (c) receiving the financial certificate from the financial services organization; and
   (d) forwarding the financial certificate to the provider.

2. The process according to claim 1 wherein the intelligent voice response unit is a value added telephone service.

3. The process according to claim 1 wherein the intelligent voice response unit receives Dual Tone Multi-frequency signals from the purchaser and the financial services organization is responsive to the signals to generate a financial certificate.

4. The process according to claim 3 wherein the intelligent voice response unit is responsive to the Dual Tone Multi-frequency signals received from the purchaser to translate the signals into rating flags that are understood by an associated billing system, the billing system being operative to generate the financial certificate.

5. A secure process for providing payment comprising the steps of:
   (a) contacting a financial services organization that utilizes an intelligent voice response unit, the intelligent voice response unit being operative to prompt information from the caller needed to generate a financial certificate, the intelligent voice response unit also being operative to receive Dual Tone Multi-frequency signals with the financial services organization being responsive to the signals and a call duration to generate a financial certificate;
   (b) requesting that the financial services organization generate the financial certificate for payment to a specified provider;
   (c) receiving the financial certificate from the financial services organization; and
   (d) forwarding the financial certificate to the provider.

6. The process according to claim 1 wherein the intelligent voice response unit has a plurality of access lines with a different predetermined rate associated with each of the lines, whereby a particular line is selected as a function of the desired certificate value.

7. The process according to claim 1 further including a certificate validation step of:
   (e) contacting the financial services organization by the provider to determine if the certificate is valid.

8. The process according to claim 7 further including the step of:
   (f) notifying the caller that the transaction is complete upon verification of the certificate by the provider.

9. The process according to claim 8 wherein the financial services organization generates an invoice for the cost of the certificate.

10. The process according to claim 7 further including, prior to step (a) contacting a provider of goods and ordering goods from the provider.

11. The process according to claim 10 wherein the party ordering the goods remains in contact with the provider while completing steps (a) through (c).

12. The process according to claim 11 wherein the contact with the provider is established with a personal computer through the internet and the contact with the financial services organization is established with a telephone through a public switched telephone network.

13. The process according to claim 11 wherein the contact with the provider is established with a personal computer through the internet and the contact with the financial services organization is established with the same personal computer through a public switched telephone network.

14. The process according to claim 11 wherein the contact with both the provider and the financial services organization is established with a telephone through a public switched telephone network.

15. The process according to claim 11 wherein the financial services organization is a 1-900 system that provides an information provider service and is affiliated with a financial institution.

16. The process according to claim 5 wherein the intelligent voice response unit is a value added telephone service.

17. The process according to claim 5 wherein the intelligent voice response unit is responsive to the Dual Tone Multi-frequency signals received from the purchaser to translate the signals into rating flags that are understood by an associated billing system, the billing system being operative to generate the financial certificate.

18. The process according to claim 5 further including a certificate validation step of:
   (e) contacting the financial services organization by the provider to determine if the certificate is valid.

19. The process according to claim 18 further including the step of:
   (f) notifying of the caller that the transaction is complete upon verification of the certificate by the provider.

20. The process according to claim 19 wherein the financial services organization generates an invoice for the cost of the certificate.

* * * * *